US011264789B2

(12) United States Patent
Chen et al.

(10) Patent No.: US 11,264,789 B2
(45) Date of Patent: Mar. 1, 2022

(54) OVER-CURRENT PROTECTION DEVICE

(71) Applicant: Fuzetec Technology Co., Ltd., New Taipei (TW)

(72) Inventors: Jack Jih-Sang Chen, New Taipei (TW); Chang-Hung Jiang, New Taipei (TW)

(73) Assignee: Fuzetec Technology Co., Ltd., New Taipei (TW)

( * ) Notice: Subject to any disclaimer, the term of this patent is extended or adjusted under 35 U.S.C. 154(b) by 631 days.

(21) Appl. No.: 16/225,436

(22) Filed: Dec. 19, 2018

(65) Prior Publication Data

US 2020/0203944 A1 Jun. 25, 2020

(51) Int. Cl.

*H02H 3/087* (2006.01)
*H01C 7/02* (2006.01)
*H02H 9/02* (2006.01)

(52) U.S. Cl.

CPC ............. *H02H 3/087* (2013.01); *H01C 7/021* (2013.01); *H02H 9/026* (2013.01)

(58) Field of Classification Search

CPC .... H01C 7/02–028; H02H 9/026; H02H 3/08; H02H 3/085; H02H 3/087
See application file for complete search history.

(56) References Cited

U.S. PATENT DOCUMENTS 4,907,340 A * 3/1990 Fang ...................... H01C 7/021 219/504
5,864,281 A * 1/1999 Zhang .................. H01C 17/006 338/22 R
6,238,598 B1 5/2001 Chen
9,455,075 B1 * 9/2016 Chen ...................... H01C 7/021
2003/0090855 A1 † 5/2003 Chu

FOREIGN PATENT DOCUMENTS

TW I634569 B † 9/2018

* cited by examiner
† cited by third party

*Primary Examiner* — Jared Fureman
*Assistant Examiner* — Christopher J Clark
(74) *Attorney, Agent, or Firm* — Akerman LLP; Peter A. Chiabotti

(57) ABSTRACT

An over-current protection device includes first and second electrodes and a positive temperature coefficient (PTC) multilayered structure disposed between the first and second electrodes. The PTC multilayered structure includes a first polymer layer that is bonded to the first electrode, an intermediate layered unit that is bonded to said first polymer layer and that includes a second polymer layer, a third polymer layer that is bonded to and disposed between the intermediate layered unit and the second electrode. The first, second and third polymer layers respectively have first, second and third volume resistances, the second volume resistance being higher than the first and third volume resistances.

20 Claims, 4 Drawing Sheets

4
33
30
(32)
3
31
2

OVER-CURRENT PROTECTION DEVICE

FIELD

The disclosure relates to an over-current protection device, and more particularly to an over-current protection device including three polymer layers, one of which is sandwiched by the other layers and has volume resistance higher than volume resistances of the other layers.

BACKGROUND

A positive temperature coefficient (PTC) over-current protection device exhibits a PTC effect that renders the same to be useful as a circuit protection device. Referring to FIG. 1, a conventional circuit protect on device 1 includes a PTC polymer layer 11 and two electrodes 12 attached to two opposite surfaces of the PTC polymer layer 11. The PTC polymer layer 11 includes a polymer matrix that contains a crystalline region and a non-crystalline region, and a particulate conductive filler dispersed in the non-crystalline region of the polymer matrix and formed into a continuous conductive path for electrical conduction between the electrodes 12. The PTC effect is a phenomenon that, when the temperature of the polymer matrix is raised to its melting point, crystals in the crystalline region start melting and result in generation of a new non-crystalline region. As the new non-crystalline region is increased to a certain extent and merges with the original non-crystalline region, the conductive path of the particulate conductive filler will become discontinuous and resistance of the PTC polymer material will increase rapidly, thereby resulting in electrical disconnection between the electrodes.

The circuit protection device 1 is used for protecting an electronic apparatus, and the polymer matrix of the PTC polymer layer 11 is selected based on an operating current and an operating voltage of the electronic apparatus. The polymer matrix of the PTC polymer layer 11 is usually made from a polyethylene-based composition. However, the circuit protection device might not have desired electrical conductivity due to a relatively poor adhesion between the PTC polymer layer 11 and the electrodes 12.

U.S. Pat. No. 6,238,598 discloses a PTC polymer blend composition and a circuit protection device. The PTC polymer blend composition includes a non-grafted polyolefin, a grafted polyolefin, and a conductive particulate material. The circuit protection device includes a PTC element having the PTC polymer blend composition and two electrodes respectively connected to two opposite sides of the PTC element. With inclusion of the grafted polyolefin in the PTC polymer blend composition, the circuit protection device has a relatively good electrical stability and good adhesion between the PTC element and the electrodes.

However, certain electrical properties (e.g., volume resistance, withstand voltage, etc.) of the circuit protection device disclosed in U.S. Pat. No. 6,238,598 may be further improved to meet industrial requirements.

SUMMARY

Therefore, an object of the disclosure is to provide an over-current protection device that can alleviate at least one of the drawbacks of the prior art.

The over-current protection device includes first and second electrodes, and a positive temperature coefficient (PTC) multilayered structure.

The PTC multilayered structure is disposed between the first and second electrodes, and includes a first polymer layer, an intermediate layered unit and a third polymer layer.

The first polymer layer is bonded to the first electrode, and includes a first polymer matrix and a first particulate conductive filler dispersed in the first polymer matrix. The first polymer matrix is made from a first polymer mixture.

The intermediate layered unit is bonded to the first polymer layer, and includes a second polymer layer. The second polymer layer includes a second polymer matrix and a second particulate conductive filler dispersed in the second polymer matrix. The second polymer matrix is made from a second polymer mixture.

The third polymer layer is bonded to and disposed between the intermediate layered unit and the second electrode, and includes a third polymer matrix and a third particulate conductive filler dispersed in the third polymer matrix. The third polymer matrix is made from a third polymer mixture.

The first, second and third polymer layers respectively have first, second and third volume resistances, and the second volume resistance is higher than the first and third volume resistances.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
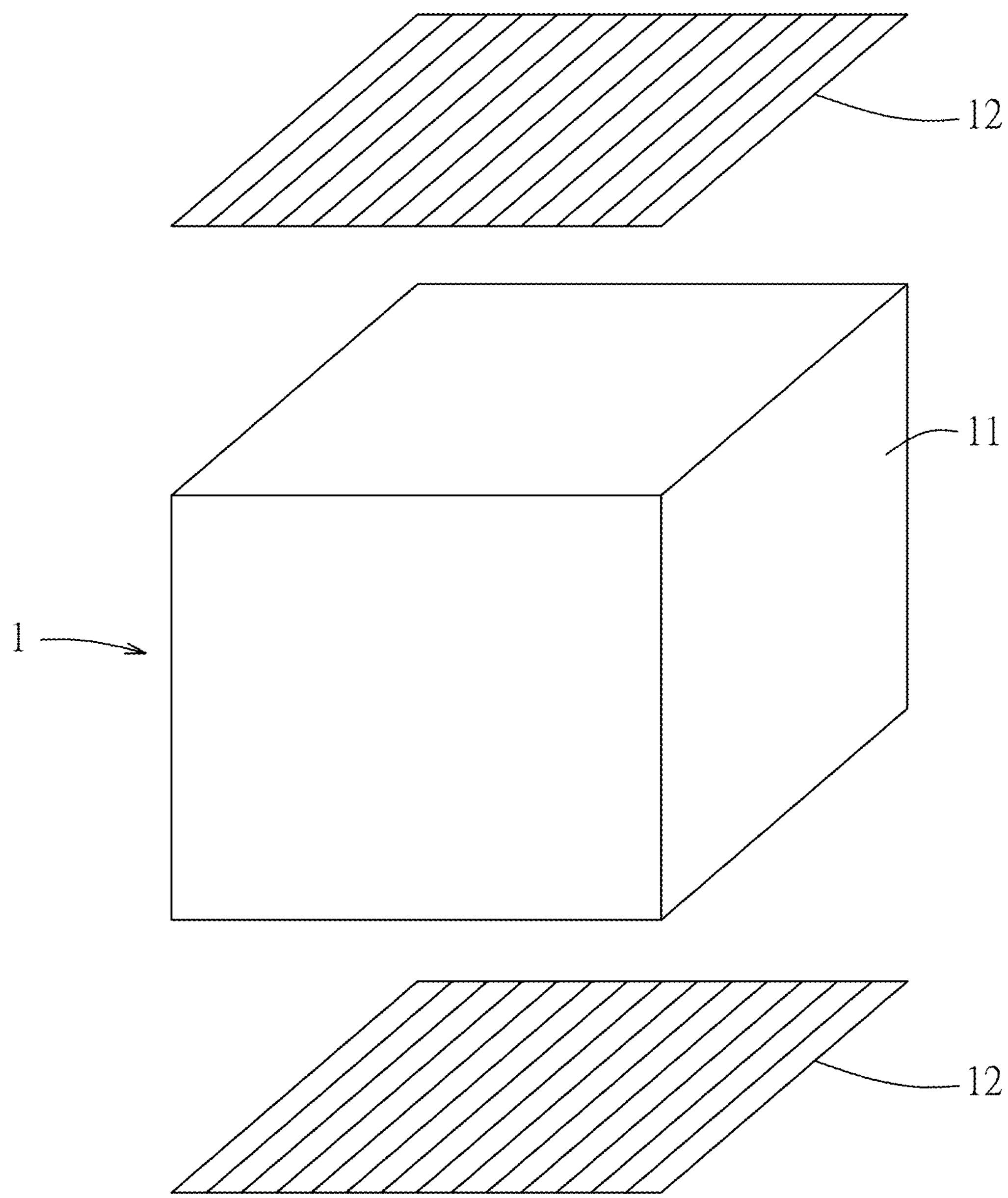
FIG. 1 is an exploded perspective view of a conventional over-current protection device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
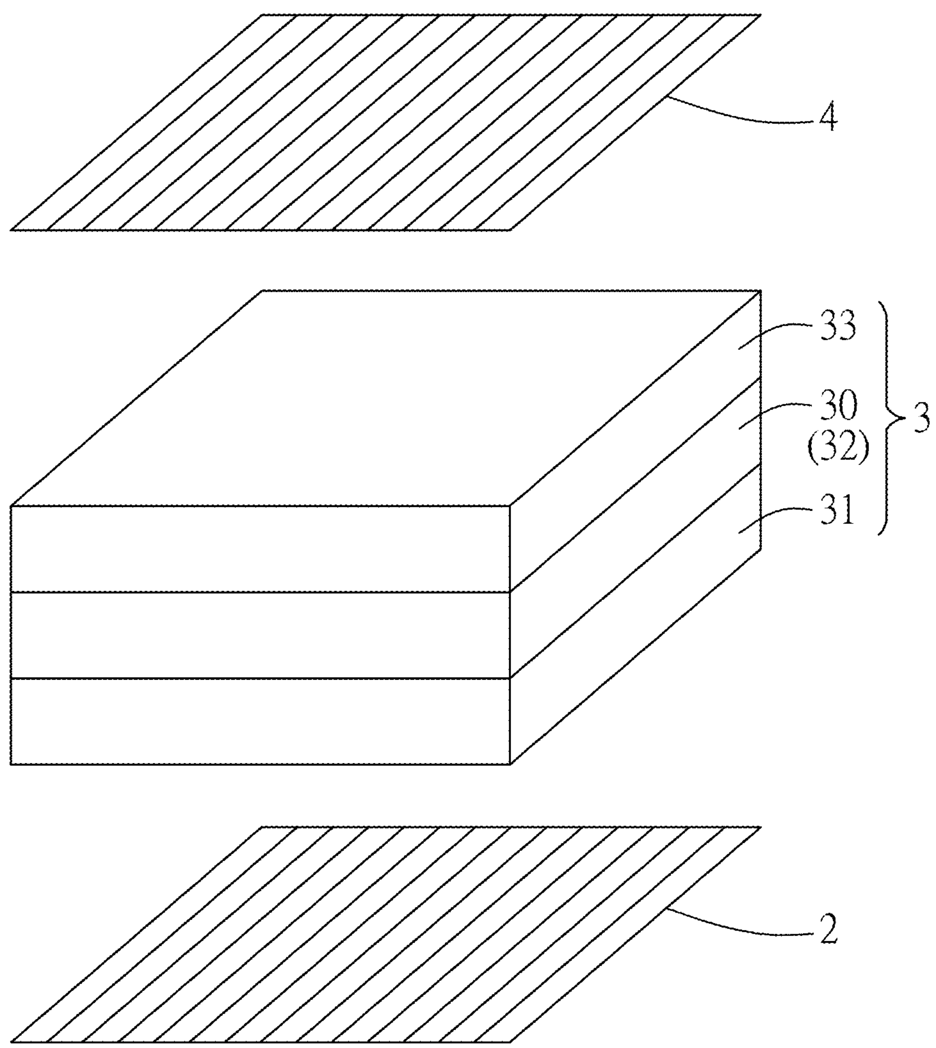
FIG. 2 is an exploded perspective view illustrating a first embodiment of an over-current protection device of this disclosure.

Referring to FIG. 2, a first embodiment of an over-current protection device includes a first electrode 2, a second electrode 4, and a positive temperature coefficient (PTC) multilayered structure 3 disposed between the first and second electrodes 2, 4.

The PTC multilayered structure 3 includes a first polymer layer 31, an intermediate layered unit 30, and a third polymer layer 33.

The first polymer layer 31 is bonded to the first electrode 2, and includes a first polymer matrix and a first particulate conductive filler that is dispersed in the first polymer matrix. The first polymer matrix is made from a first polymer mixture.

The intermediate layered unit 30 is bonded to the first polymer layer 31 and includes a second polymer layer 32. The second polymer layer 32 includes a second polymer matrix and a second particulate conductive filler that is dispersed in the second polymer matrix. The second polymer matrix is made from a second polymer mixture.

The third polymer layer 33 is bonded to and disposed between the intermediate layered unit 30 and the second electrode 4. The third polymer layer 33 includes a third polymer matrix and a third particulate conductive filler that is dispersed in the third polymer matrix. The third polymer matrix is made from a third polymer mixture.

The first, second and third polymer layers 31, 32, 33 respectively have first, second and third volume resistances, and the second volume resistance is higher than the first and third volume resistances.

In certain embodiments, the second volume resistance is at least 1.4 times higher than the first and third volume resistances.

According to this disclosure, each of the first, second and third polymer mixtures may independently contain a non-grafted olefin-based polymer and a grafted olefin-based polymer.

The non-grafted olefin-based polymer of each of the first, second and third polymer mixtures may be high density polyethylene (HDPE). The grafted olefin-based polymer of each of the first, second and third polymer mixtures may include an unsaturated carboxylic acid grafted polyolefin.

In certain embodiments, the grafted olefin-based polymer of the first polymer mixture is present in an amount ranging from 19 wt % to 23 wt % based on total weight, of the first polymer mixture and the first particulate conductive filler. The grafted olefin-based polymer of the third polymer mixture is present in an amount ranging from 19 wt % to 23 wt % based on total weight of the third polymer mixture and the third particulate conductive filler.

In certain embodiments, the grafted olefin-based polymer of the second polymer mixture is present in an amount ranging from 22 wt % to 25 wt % based on total weight of the second polymer mixture and the second particulate conductive filler.

Examples of each of the first, second and third particulate conductive fillers may include, but are not limited to, carbon black, a metallic powder, a conductive ceramic powder, and combinations thereof.

In certain embodiments, the first, second and third particulate conductive fillers are carbon black.

Figure 3:
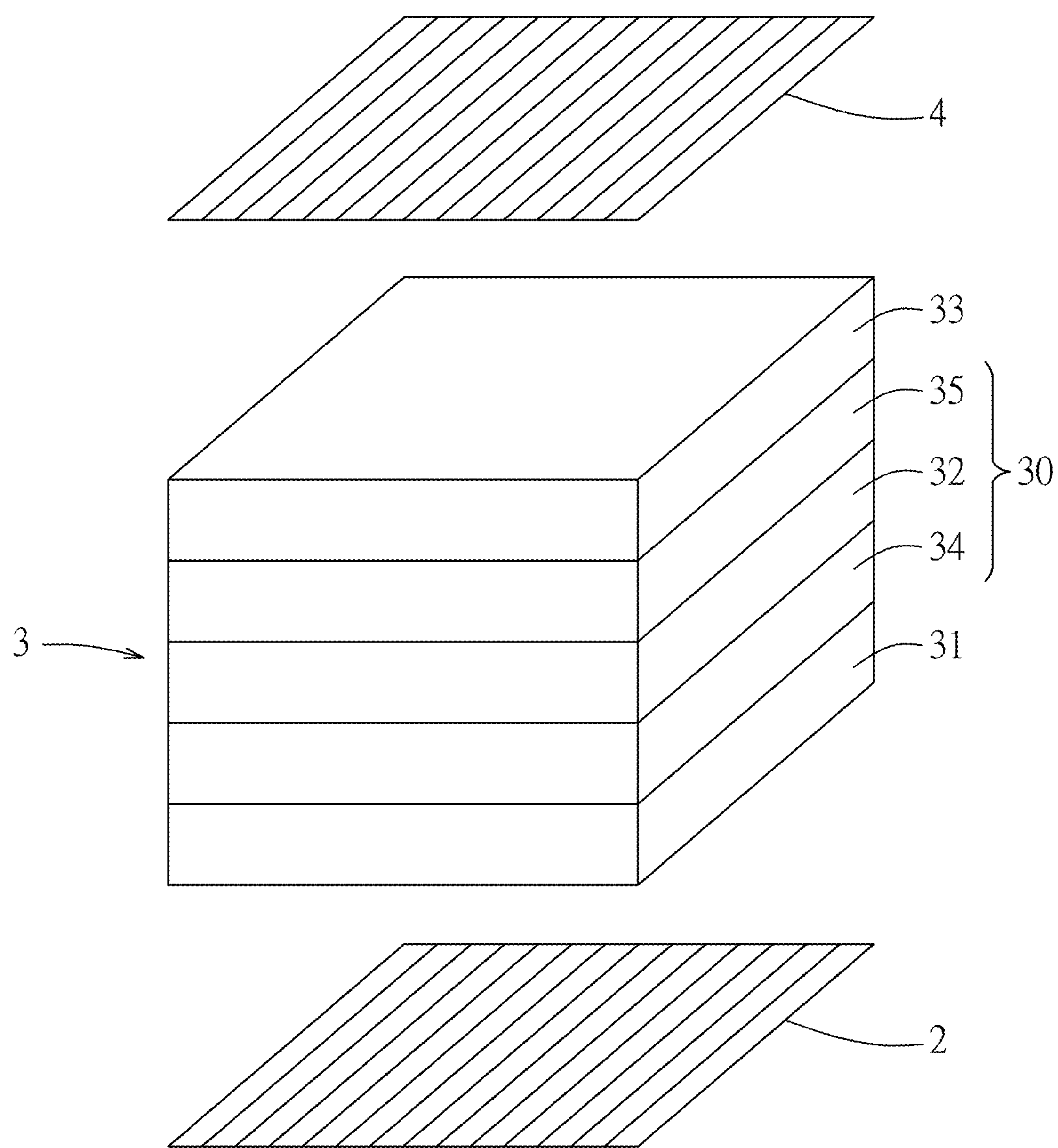
FIG. 3 is an exploded perspective view illustrating a second embodiment of an over-current protection device of this disclosure.

Referring to FIG. 3, a second embodiment of the over-current protection device according to the disclosure is illustrated. The second embodiment of the over-current protection device has a structure similar to that of the first embodiment, except that, in the second embodiment, the intermediate layered unit 30 further includes two additional polymer layers, i.e., a fourth polymer layer 34 and a fifth polymer layer 35.

Figure 4:
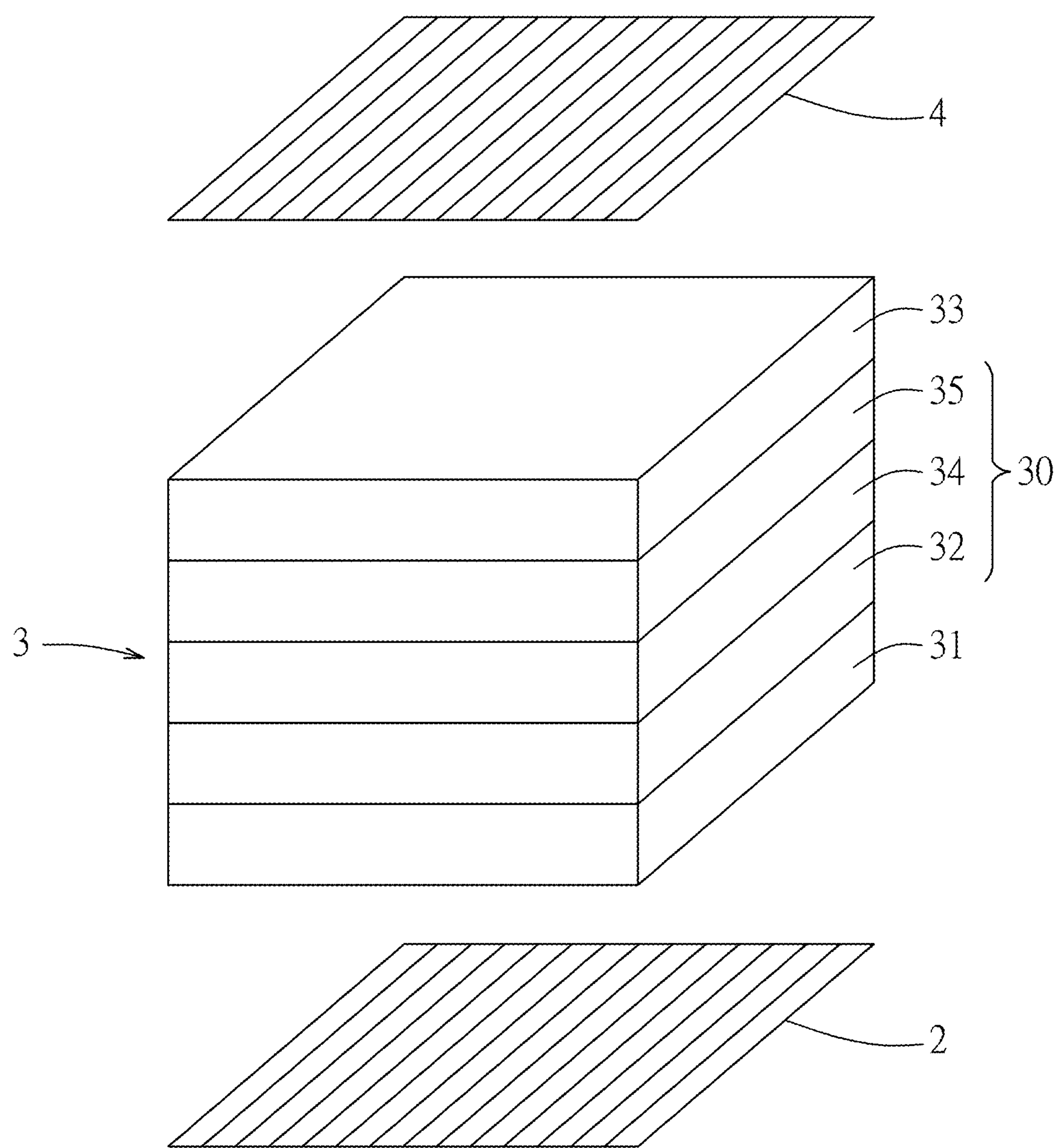
FIG. 4 is an exploded perspective view illustrating a variation of the second embodiment of the over-current protection device of this disclosure.

In this embodiment, the second polymer layer 32 is disposed between the fourth and fifth polymer layers 34, 35, but the arrangement of these polymer layers is not limited thereto. In a variation of the second embodiment, the fourth polymer layer 34 is disposed between the second and fifth polymer layers 32, 35 (see FIG. 4). In another variation of the second embodiment, the fifth polymer layer 35 is disposed between the second and fourth polymer layers 32, 34.

Each of the fourth and fifth polymer layers 34, 35 includes a polymer matrix that is made from a polymer mixture, and a particulate conductive filler that is dispersed in the polymer matrix. Suitable components of the polymer mixture and the particulate conductive filler of the fourth and fifth polymer layers 34, 35 can be referred to those defined with respect to the first, second and third polymer mixtures and the first, second and third particulate conductive fillers, and thus are not further described herein for the sake of brevity.

The fourth and fifth polymer layers 34, 35 respectively have a fourth volume resistance and a fifth volume resistance, which may be higher or lower than the first, second and third volume resistances, as long as the second volume resistance is higher than the first and third volume resistance.

In certain embodiments, the second volume resistance is higher than at least one of the fourth and fifth volume resistances. In an exemplary embodiment, the second volume resistance is at least 1.4 times higher than at least one of the fourth and fifth volume resistances.

In other embodiments, each of the fourth and fifth volume resistances is higher than the first and third resistances. In an exemplary embodiment, the second volume resistance is at least 1.4 times higher than each of the fourth and fifth volume resistances, and the fourth and fifth volume resistances are at least 1.4 times higher than the first and third volume resistances.

It should be noted that the number of the layer included in the intermediate layered unit 30 may vary based on actual requirements. For example, in addition to the second polymer layer 32, the intermediate layered unit 30 may only further include the fourth polymer layer 34 that is disposed between the first and second polymer layers 31, 32 or between the second and third polymer layers 32, 33.

The following examples and comparative examples are provided to illustrate the embodiment of the disclosure, and should not be construed as limiting the scope of the disclosure.

EXAMPLES

Preparation of Polymer Blend Composition

Three polymer blend compositions (i.e. R-H, R-M and R-L) used in the following examples were prepared using carbon black (CB) (purchased from Columbian Chemicals Company, catalog no.: Raven 430UB, having a DBP/D of 0.95 and a bulk density of 0.53 g/cm$^3$) serving as the particulate conductive filler, a polymer mixture that includes HDPE (purchased from Formosa Plastics Corp., catalog no.: HDPE9002) serving as the non-grafted olefin-based polymer, and unsaturated carboxylic acid grafted polyolefin (i.e., maleic anhydride grafted-HDPE (MA-g-HDPE) (purchased from Dupont, catalog no.: MB100D) serving as the grafted olefin-based polymer. The weight percentages of HDPE, MA-g-HDPE and CB in each of the three polymer blend compositions are shown in Table 1.

The three polymer blend compositions were separately compounded in a Brabender mixer. The compounding temperature was 200° C., the stirring rate was 30 rpm, and the compounding time was 10 minutes, so as to obtain three compounded mixtures (i.e., R-H, R-M and R-L). Each of the compounded mixtures was placed in a mold and then hot-pressed at 200° C. and 80 kg/cm$^2$ for 4 minutes to form a sheet. The sheet was moved out and placed between two nickel-plated copper foils each having a thickness of 0.43 mm. The combination of the sheet and the nickel-plated copper foils was then subjected to the hot-pressing treatment under the same conditions as mentioned above. The resultant thin plate having a thickness of 0.5 mm was cut into a plurality of chips, each of which has an area size of 64 cm$^2$. The chip made from each polymer blend composition was irradiated by a cobalt-60 gamma-ray that was generated by an irradiator with a total radiation dose of 150 kGy. The initial resistance of each chip at the temperature of 25° C. was measured using a micro-ohm meter. The average values of the resistance of the chips made from each polymer blend composition and the volume resistance thereof are shown in Table 1. As shown in Table 1, the volume resistance of the polymer blend composition R-H is higher than that of the polymer blend composition R-M, and the volume resistance of the polymer blend composition R-M is higher than that of the polymer blend composition R-L.

TABLE 1

| | Polymer blend composition | | | Chip (thickness = 0.5 mm) | |
|---|---|---|---|---|---|
| | Polymer mixture | | | Initial | Volume |
| | HDPE (wt %) | MA-G-HDPE (wt %) | CB (wt %) | Resistance (ohm) | resistance (ohm · cm) |
| R-H | 24.0 | 24.0 | 52.0 | 0.056 | 0.717 |
| R-M | 22.5 | 22.5 | 55.0 | 0.030 | 0.384 |
| R-L | 21.0 | 21.0 | 58.0 | 0.021 | 0.269 |

Preparation of Circuit Protection Device

The circuit protection devices of each of the following Examples 1 to 12 (E1-E12) and Comparative Examples 1 to 18 (CE1-CE18) were prepared using at least one of the above three compounded mixtures R-H, R-M and R-L to form a single layered structure or a multilayered structure (see Table 2). The detailed procedures and conditions in preparing the devices of each example are described as follows.

TABLE 2

| | | Intermediate layered unit | | | |
|---|---|---|---|---|---|
| | First polymer layer | Second polymer layer | Fourth polymer layer | Fifth polymer layer | Third polymer layer |
| E1 | R-M | R-H | — | — | R-M |
| E2 | R-L | R-H | — | — | R-L |
| E3 | R-L | R-H | — | — | R-M |
| E4 | R-L | R-M | — | — | R-L |
| E5 | R-M | R-H | R-L | R-L | R-M |
| E6 | R-M | R-H | R-L | R-H | R-M |
| E7 | R-M | R-H | R-M | R-H | R-M |
| E8 | R-L | R-M | R-H | R-M | R-L |
| E9 | R-L | R-M | R-L | R-M | R-L |
| E10 | R-L | R-H | R-M | R-H | R-L |
| E11 | R-L | R-H | R-L | R-H | R-L |
| E12 | R-L | R-H | R-L | R-M | R-L |
| CE1 | R-H | — | — | — | — |
| CE2 | R-H | — | — | — | R-H |
| CE3 | R-H | R-H | — | — | R-H |
| CE4 | R-M | — | — | — | — |
| CE5 | R-M | — | — | — | R-M |
| CE6 | R-M | R-M | — | — | R-M |
| CE7 | R-L | — | — | — | — |
| CE8 | R-L | — | — | — | R-L |
| CE9 | R-L | R-L | — | — | R-L |
| CE10 | R-H | — | — | — | R-M |
| CE11 | R-H | — | — | — | R-L |
| CE12 | R-M | — | — | — | R-L |
| CE13 | R-H | R-M | — | — | R-L |
| CE14 | R-H | R-M | — | — | R-H |
| CE15 | R-H | R-L | — | — | R-H |
| CE16 | R-H | R-L | — | — | R-M |
| CE17 | R-H | R-M | R-L | R-M | R-H |
| CE18 | R-H | R-L | R-M | R-L | R-H |

Example 1 (E1)

The compounded mixture R-M was first placed in a mold, and then the compounded mixtures R-H and R-M were sequentially stacked thereon (i.e., the compounded mixture R-H was sandwiched between the two compounded mixtures R-M). After hot-pressing at 200° C. and 80 kg/cm$^2$ for 4 minutes, the two compounded mixtures R-M were formed into first and third polymer layers 31, 33, and the compounded mixture R-H was formed into a intermediated layered unit 30 (i.e., a second polymer layer 32) attached to the first and third polymer layers 31, 33 as shown in FIG. 2, each layer having a thickness of 0.64 mm.

Subsequently, two nickel-plated copper foil sheets (serving as the first electrode 2 and the second electrode 4) were respectively attached to the first and third polymer layers 31, 33 oppositely of the second polymer layer 32, and were hot-pressed at 200° C. and 80 kg/cm$^2$ for 4 minutes to form a PTC polymer laminate having a thickness of 2 mm. The PTC polymer laminate was cut into a plurality of chips, each of which has an area size of 8 mm×8 mm. The chips were irradiated by a cobalt-60 gamma-ray generated by an irradiator with a total radiation dose of 150 kGy, so as to form a plurality of test circuit protection devices of Example 1 (E1).

Examples 2 to 4 (E2-E4)

The procedures and conditions in preparing test circuit protection devices of E2 to E4 were similar to those of E1, except for the blend compositions used in the first, second and third polymer layers 31, 32, 33. It should be noted that, in each of E1 to E4, the second polymer layer 32 had a volume resistance that is higher than the volume resistances of the first and third polymer layers 31, 33.

Examples 5 to 12 (E5-E12)

The procedures and conditions in preparing test circuit protection devices of E5 to E12 were similar to those of E1, except that the intermediate layered unit 30 of each of E5 to E12 further included a fourth polymer layer 34 and a fifth polymer layer 35. In addition, in E5, the second polymer layer 32 is disposed between the fourth and fifth polymer layers 34, 35, which are respectively attached to the first and third polymer layers 31, 33 (see FIG. 3). In E6 to E12, the fourth polymer layer 34 is disposed between the second and fifth polymer layers 32, 35, which are respectively attached to the first and third polymer layers 31, 33 (see FIG. 4).

Each of the first to fifth polymer layers 31, 32, 33, 34, 35 was made from the polymer blend composition listed in Table 2, and had a thickness of 0.39 mm.

Comparative Examples 1, 4 and 7 (CE1, CE4 and CE7)

The procedures and conditions in preparing the test circuit protection devices of CE1, CE4 and CE7 were similar to those of E1 except that, the test devices of CE1, CE4 and CE7 did not have the second and third polymer layers (i.e., a single layered structure), and the two nickel-plated copper foil sheets were respectively attached to two opposite surfaces of the first polymer layer (see FIG. 1). In addition, the first polymer layer had a thickness of 1.93 mm and was made from the polymer blend composition listed in Table 2.

Comparative Examples 2, 5, 8 and 10-12 (CE2, CE5, CE8 and CE10-CE12)

The procedures and conditions in preparing the test circuit protection devices of CE2, CE5, CE8 and CE10 to CE12 were similar to those of E1 except that, the test devices of CE2, CE5, CE8 and CE10 to CE12 did not have the second polymer layer (i.e., a two-layered structure), and each of the first and third polymer layers had a thickness of 0.97 mm and was made from the polymer blend composition listed in Table 2.

Comparative Examples 3, 6, 9 and 13-16 (CE3, CE6, CE9 and CE13-CE16)

The procedures and conditions in preparing the test circuit protection devices of CE3, CE6, CE9 and CE13 to CE16 were similar to those of E1 except that, the second polymer layer in each of CE3, CE6, CE9 and CE13 CE16 had a volume resistance that is not higher than the volume resistances of the first and polymer layers. Each of the first to third polymer layers in these examples was made from the polymer blend composition listed in Table 2.

Comparative Examples 17-18 (CE17-CE18)

The procedures and conditions in preparing the test circuit protection devices of CE17 and CE18 were similar to those of E6 except that, each of the second, fourth and fifth polymer layers had a volume resistance that is lower than the volume resistances of the first and third polymer layers. Each of the first to fifth polymer layers in CE17 to CE18 was made from the polymer blend composition listed in Table 2.

Performance Tests

Initial Resistance Test (Resistance at Room Temperature)

Ten test circuit protection devices of each of E1 to E12 and CE1 to CE18 were subjected to an initial resistance test using a micro-ohm meter.

The initial resistance of each of the test devices of E1 to E12 and CE1 to CE18 at the temperature of 25° C. was measured. The average values of the resistance of the test devices of each of E1 to E12 and CE1 to CE18 and the volume resistance thereof are shown in Table 3.

Breakdown Test

Ten test circuit protection devices of each of E1 to E12 and CE1 to CE18 were subjected to a breakdown test to determine the passing ratio of the test devices of each of E1 to E12 and CE1 to CE18 at which the test devices were not burnt. The breakdown test was conducted for 10 cycles. Each cycle was conducted with each of the test devices subjected to a given DC voltage (100 V, 150 V and 200 V) and a given current (3 A, 5 A and 7 A) for 60 seconds, followed by disconnection for 60 seconds.

The results of the breakdown test (n/10×100%, n represents the number of the test devices passing the breakdown test without being burnt) are shown in Table 3.

TABLE 3

| | Resistance test | | Passing ratio of the breakdown test (%) | | | | | | | | |
|---|---|---|---|---|---|---|---|---|---|---|---|
| | Initial resistance | volume resistance | 100 Vdc | | | 150 Vdc | | | 200 Vdc | | |
| | (ohm) | (ohm · cm) | 3 A | 5 A | 7 A | 3 A | 5 A | 7 A | 3 A | 5 A | 7 A |
| E1 | 0.154 | 0.493 | 100 | 100 | 100 | 100 | 100 | 100 | 100 | 100 | 100 |
| E2 | 0.128 | 0.410 | 100 | 100 | 100 | 100 | 100 | 100 | 100 | 100 | 100 |
| E3 | 0.141 | 0.451 | 100 | 100 | 100 | 100 | 100 | 100 | 100 | 100 | 100 |
| E4 | 0.094 | 0.301 | 100 | 100 | 100 | 100 | 100 | 100 | 100 | 90 | 90 |
| E5 | 0.125 | 0.400 | 100 | 100 | 100 | 100 | 100 | 100 | 100 | 100 | 100 |
| E6 | 0.152 | 0.486 | 100 | 100 | 100 | 100 | 100 | 100 | 100 | 100 | 100 |
| E7 | 0.155 | 0.496 | 100 | 100 | 100 | 100 | 100 | 100 | 100 | 100 | 100 |
| E8 | 0.123 | 0.394 | 100 | 100 | 100 | 100 | 100 | 100 | 100 | 100 | 100 |
| E9 | 0.096 | 0.307 | 100 | 100 | 100 | 100 | 100 | 100 | 100 | 90 | 90 |
| E10 | 0.144 | 0.461 | 100 | 100 | 100 | 100 | 100 | 100 | 100 | 100 | 100 |
| E11 | 0.136 | 0.435 | 100 | 100 | 100 | 100 | 100 | 100 | 100 | 100 | 100 |
| E12 | 0.116 | 0.371 | 100 | 100 | 100 | 100 | 100 | 100 | 100 | 100 | 90 |
| CE1 | 0.220 | 0.704 | 100 | 100 | 100 | 100 | 90 | 90 | 80 | 80 | 70 |
| CE2 | 0.221 | 0.707 | 100 | 100 | 100 | 100 | 90 | 90 | 80 | 80 | 80 |
| CE3 | 0.222 | 0.710 | 100 | 100 | 100 | 100 | 90 | 90 | 80 | 80 | 80 |
| CE4 | 0.119 | 0.381 | 100 | 100 | 100 | 80 | 70 | 70 | 60 | 60 | 50 |
| CE5 | 0.121 | 0.387 | 100 | 100 | 100 | 80 | 70 | 70 | 60 | 50 | 50 |
| CE6 | 0.120 | 0.384 | 100 | 100 | 100 | 80 | 80 | 70 | 60 | 60 | 50 |
| CE7 | 0.079 | 0.253 | 80 | 80 | 70 | 40 | 40 | 20 | 20 | 10 | 0 |
| CE8 | 0.080 | 0.256 | 80 | 70 | 70 | 40 | 30 | 20 | 30 | 20 | 0 |
| CE9 | 0.081 | 0.259 | 80 | 80 | 70 | 40 | 40 | 20 | 20 | 20 | 0 |
| CE10 | 0.171 | 0.547 | 100 | 100 | 100 | 80 | 80 | 70 | 60 | 60 | 50 |
| CE11 | 0.152 | 0.486 | 90 | 80 | 70 | 40 | 40 | 30 | 40 | 20 | 10 |
| CE12 | 0.101 | 0.323 | 90 | 70 | 70 | 50 | 40 | 30 | 30 | 30 | 10 |
| CE13 | 0.141 | 0.451 | 90 | 90 | 90 | 70 | 70 | 50 | 60 | 40 | 20 |
| CE14 | 0.188 | 0.602 | 100 | 100 | 100 | 80 | 80 | 80 | 70 | 70 | 60 |
| CE15 | 0.175 | 0.560 | 90 | 90 | 80 | 70 | 70 | 60 | 60 | 30 | 20 |
| CE16 | 0.141 | 0.451 | 90 | 80 | 80 | 60 | 60 | 50 | 40 | 20 | 10 |
| CE17 | 0.152 | 0.486 | 90 | 90 | 80 | 70 | 60 | 50 | 50 | 20 | 10 |
| CE18 | 0.144 | 0.461 | 90 | 80 | 80 | 60 | 60 | 50 | 40 | 20 | 20 |

It can be seen from Table 3 that the test devices of CE1 to CE3, CE4 to CE6 and CE7 to CE3 exhibited substantially the same initial resistance and the same volume resistance, indicating that use of the same polymer blend composition to form a single layered or a multilayered structure does not vary the resistance of the resultant circuit protecting device.

In addition, almost all of the test devices of E1 to E12 passed the breakdown test. The test devices of CE1 to CE18 have a relatively low passing ratio under a high voltage of 200 Vdc (ranging from 0% to 80%). This indicates that the test devices of CE1 to CE18 are easily damaged or burnt at a high voltage.

Specifically, as compared with the test devices of CE1 to CE3, the test devices of E1 to E3 (i.e., with the second polymer layer 32 sandwiched between the two polymer layers 31, 33 having a relatively lower resistance) had a relatively lower volume resistance, and a relatively higher passing ratio of the breakdown test, particularly under high voltage. Similar results can be observed with the test devices of E4 and CE4 to CE9. Moreover, as compared with E1 to E4, the test devices of CE10 to CE16, which include the second polymer layer sandwiched between the two polymer layers having a relatively higher resistance than that of the second polymer layer, were susceptible to break down. However, by way of the inclusion of the second polymer layer 32 having a resistance that is higher than those of the first and third polymer layers 31, 33, the over-current protection device can effectively withstand breakdown. The applicant infers that the undesired electric arc and flashover are likely to occur when the polymer layers each having a relatively high resistance is directly bonded to the electrodes (e.g. CE10 to CE16) under high voltage and high current, thereby causing damage or burning down of the devices. However, in this disclosure, the polymer layers each having a relatively high resistance do not directly contact the electrodes, the undesired electric arc and flashover can be significantly avoid.

Regarding the test devices having a five-layered structure (i.e., E5 to E12 and CE17 to CE18), the test devices of E5 to E12 have a relatively higher passing ratio under a high voltage of 200 Vdc, while the test devices of CE17 to CE18 only have a passing ratio ranging from 10% to 50%. This indicates that with the second polymer layer 32 of the intermediate layered unit 30 having a volume resistance that is higher than those of the first and third polymer layer 31, 33, the passing ratio of the breakdown test for the test devices of E5 to E12 can be significantly increased.

To sum up, by controlling the volume resistance of the second polymer layer higher than those of the first and third polymer layers, the over-current protection device of this disclosure exhibits good electrical properties.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An over-current protection device comprising:

first and second electrodes; and a positive temperature coefficient (PTC) multilayered structure disposed between said first and second electrodes and including:

a first polymer layer that is bonded to said first electrode and that includes a first polymer matrix and a first particulate conductive filler dispersed in said first polymer matrix, said first polymer matrix being made from a first polymer mixture;

an intermediate layered unit that is bonded to said first polymer layer and that includes a second polymer layer, said second polymer layer including a second polymer matrix and a second particulate conductive filler dispersed in said second polymer matrix, said second polymer matrix being made from a second polymer mixture;

a third polymer layer that is bonded to and disposed between said intermediate layered unit and said second electrode, and that includes a third polymer matrix and a third particulate conductive filler dispersed in said third polymer matrix, said third polymer matrix being made from a third polymer mixture;

wherein said first, second and third polymer layers respectively have first, second and third volume resistances, said second volume resistance being higher than said first and third volume resistances; and said second volume resistance is at least 1.4 times higher than said first and third volume resistances.

2. The over-current protection device of claim 1, wherein each of said first, second and third polymer mixtures independently contains a non-grafted olefin-based polymer and a grafted olefin-based polymer.

3. The over-current protection device of claim 2, wherein said grafted olefin-based polymer of said first polymer mixture is present in an amount ranging from 19 wt % to 23 wt % based on total weight of said first polymer mixture and said first particulate conductive filler, and said grafted olefin-based polymer of said third polymer mixture is present in an amount ranging from 19 wt % to 23 wt % based on total weight of said third polymer mixture and said third particulate conductive filler.

4. The over-current protection device of claim 2, wherein said grafted olefin-based polymer of said second polymer mixture is present in an amount ranging from 22 wt % to 25 wt % based on total weight of said second polymer mixture and said second particulate conductive filler.

5. The over-current protection device of claim 2, wherein said non-grafted olefin-based polymer of each of said first, second and third polymer mixtures is high density polyethylene (HDPE).

6. The over-current protection device of claim 2, wherein said grafted olefin-based polymer of each of said first, second and third polymer mixtures includes an unsaturated carboxylic acid grafted polyolefin.

7. The over-current protection device of claim 1, wherein said first, second and third particulate conductive fillers are independently selected from the group consisting of carbon black, a metallic powder, a conductive ceramic powder, and combinations thereof.

8. The over-current protection device of claim 7, wherein said first, second and third particulate conductive fillers are carbon black.

9. An over-current protection device comprising:

first and second electrodes; and a positive temperature coefficient (PTC) multilayered structure disposed between said first and second electrodes and including:

a first polymer layer that is bonded to said first electrode and that includes a first polymer matrix and a first particulate conductive filler dispersed in said first polymer matrix, said first polymer matrix being made from a first polymer mixture;

an intermediate layered unit that is bonded to said first polymer layer and that includes a second polymer layer, said second polymer layer including a second polymer matrix and a second particulate conductive filler dispersed in said second polymer matrix, said second polymer matrix being made from a second polymer mixture;

a third polymer layer that is bonded to and disposed between said intermediate layered unit and said second electrode, and that includes a third polymer matrix and a third particulate conductive filler dispersed in said third polymer matrix, said third polymer matrix being made from a third polymer mixture;

wherein said first, second and third polymer layers respectively have first, second and third volume resistances, said second volume resistance being higher than said first and third volume resistances, and wherein said intermediate layered unit further includes a fourth polymer layer.

10. The over-current protection device of claim 9, wherein said intermediate layered unit further includes a fifth polymer layer, said second polymer layer disposed between said fourth and fifth polymer layers.

11. The over-current protection device of claim 10, wherein said fifth polymer layer has a fifth volume resistance, said second volume resistance being higher than said fifth volume resistance.

12. The over-current protection device of claim 9, wherein said intermediate layered unit further includes a fifth polymer layer, said fifth polymer layer disposed between said second and fourth polymer layers.

13. The over-current protection device of claim 9, wherein said intermediate layered unit further includes a fifth polymer layer, said fourth polymer layer disposed between said second and fifth polymer layers.

14. The over-current protection device of claim 9, wherein said second volume resistance is at least 1.4 times higher than said first and third volume resistances.

15. The over-current protection device of claim 9, wherein said fourth polymer layer has a fourth volume resistance, said second volume resistance being higher than said fourth volume resistance.

16. The over-current protection device of claim 15, wherein said second volume resistance is at least 1.4 times higher than said fourth volume resistance.

17. An over-current protection device comprising:

first and second electrodes; and a positive temperature coefficient (PTC) multilayered structure disposed between said first and second electrodes and including:

a first polymer layer that is bonded to said first electrode and that includes a first polymer matrix and a first particulate conductive filler dispersed in said first polymer matrix, said first polymer matrix being made from a first polymer mixture;

an intermediate layered unit that is bonded to said first polymer layer and that includes a second polymer layer, said second polymer layer including a second polymer matrix and a second particulate conductive filler dispersed in said second polymer matrix, said second polymer matrix being made from a second polymer mixture;

a third polymer layer that is bonded to and disposed between said intermediate layered unit and said second electrode, and that includes a third polymer matrix and a third particulate conductive filler dispersed in said third polymer matrix, said third polymer matrix being made from a third polymer mixture;

wherein said first, second and third polymer layers respectively have first, second and third volume resistances, said second volume resistance being higher than said first and third volume resistances, and wherein said intermediate layered unit further includes a fourth polymer layer having a fourth volume resistance and a fifth polymer layer having a fifth volume resistance, said second volume resistance being higher than at least one of said fourth and fifth volume resistances.

18. The over-current protection device of claim 17, wherein said second volume resistance is at least 1.4 times higher than at least one of said fourth and fifth volume resistances.

19. The over-current protection device of claim 18, wherein said second volume resistance is at least 1.4 times higher than said fourth and fifth volume resistances, and said fourth and fifth volume resistances are at least 1.4 times higher than said first and third volume resistances.

20. The over-current protection device of claim 17, wherein said second volume resistance is at least 1.4 times higher than said first and third volume resistances.

* * * * *